(12) United States Patent
Vadali et al.

(10) Patent No.: US 11,995,156 B2
(45) Date of Patent: May 28, 2024

(54) CONFIDENCE AIDED UPSAMPLING OF CATEGORICAL MAPS

(71) Applicant: Samsung Electronics Co., Ltd., Suwon-si (KR)

(72) Inventors: Rama Mythili Vadali, Vista, CA (US); Oleg Sergeyevich Khoruzhiy, La Jolla, CA (US); Maiyuran Wijay, San Diego, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 258 days.

(21) Appl. No.: 17/503,121

(22) Filed: Oct. 15, 2021

(65) Prior Publication Data

US 2022/0245407 A1 Aug. 4, 2022

Related U.S. Application Data

(60) Provisional application No. 63/234,649, filed on Aug. 18, 2021, provisional application No. 63/145,193, filed on Feb. 3, 2021.

(51) Int. Cl.
| | |
|---|---|
| *G06F 18/2415* | (2023.01) |
| *G06F 18/2431* | (2023.01) |
| *G06T 3/40* | (2006.01) |
| *G06T 5/20* | (2006.01) |

(52) U.S. Cl.
CPC ...... *G06F 18/2415* (2023.01); *G06F 18/2431* (2023.01); *G06T 3/40* (2013.01); *G06T 5/20* (2013.01); *G06T 2207/20016* (2013.01); *G06T 2207/20024* (2013.01)

(58) Field of Classification Search
CPC ............... G06F 18/217; G06F 18/2431; G06F 18/2415; G06T 3/40; G06T 2207/20024; G06T 2207/20016; G06T 5/20
See application file for complete search history.

(56) References Cited

U.S. PATENT DOCUMENTS

| | | | |
|---|---|---|---|
| 8,428,364 B2 | 4/2013 | Liu et al. | |
| 9,240,049 B2 | 1/2016 | Ciurea et al. | |
| 9,269,184 B2 | 2/2016 | Diamand | |
| 9,736,454 B2 | 8/2017 | Hannuksela et al. | |
| 10,284,810 B1 | 5/2019 | Shoa Hassani Lashdan et al. | |
| 10,679,326 B2 | 6/2020 | Tanaka | |
| 2012/0081553 A1* | 4/2012 | Cote | G06T 5/20 348/E9.037 |
| 2018/0129919 A1* | 5/2018 | Tang | G06V 30/274 |
| 2020/0211161 A1* | 7/2020 | Trejo | G06T 5/002 |
| 2020/0302225 A1 | 9/2020 | Dutta et al. | |
| 2022/0060619 A1* | 2/2022 | Pinhasov | G06V 20/10 |

* cited by examiner

*Primary Examiner* — Margaret G Mastrodonato
(74) *Attorney, Agent, or Firm* — Lewis Roca Rothgerber Christie LLP (57) ABSTRACT

A system and method for confidence aided upsampling of categorical maps. In some embodiments, the method includes: determining a category of a first pixel of an image, the first pixel having a plurality of neighboring pixels, each of the neighboring pixels having a category; and processing the image based on the determined category. The determining may include: calculating a confidence weighted metric for each of the neighboring pixels, the confidence weighted metric being based on a maximum confidence value among each of the neighboring pixels; and determining the category of the first pixel based on the confidence weighted metric of each of the neighboring pixels and based on the category of one of the neighboring pixels.

18 Claims, 10 Drawing Sheets

CONFIDENCE AIDED UPSAMPLING OF CATEGORICAL MAPS

CROSS-REFERENCE TO RELATED APPLICATION(S)

The present application claims priority to and the benefit of (i) U.S. Provisional Application No. 63/145,193, filed Feb. 3, 2021, entitled "ENHANCED NEAREST NEIGHBOR UPSAMPLING OF CATEGORICAL MAPS AIDED BY CONFIDENCE WEIGHTING" and (ii) U.S. Provisional Application No. 63/234,649, filed Aug. 18, 2021, entitled "ENHANCED NEAREST NEIGHBOR UPSAMPLING OF CATEGORICAL MAPS AIDED BY CONFIDENCE WEIGHTING", the entire contents of both which are incorporated herein by reference.

FIELD

One or more aspects of embodiments according to the present disclosure relate to categorical map generation, and more particularly to the generation of upsampled categorical maps.

BACKGROUND

In systems and methods for processing images and for producing categorical maps, upsampling may be computationally burdensome, with a complexity that may be O(N*C) (i.e., of order N*C) where N is the number of pixels and C is the cardinality of the categorical data. Moreover, the related art method of nearest neighbor upsampling may have low complexity but may also be of lower quality, e.g., it may be affected by jagging artifacts at the edges.

Thus, there is a need for an improved system and method for upsampling of categorical maps.

SUMMARY

According to an embodiment of the present disclosure, there is provided a method, including: determining a category of a first pixel of an image, the first pixel having a plurality of neighboring pixels, each of the neighboring pixels having a category; and processing the image based on the determined category, the determining including: calculating a confidence weighted metric for each of the neighboring pixels, the confidence weighted metric being based on a maximum confidence value among each of the neighboring pixels; and determining the category of the first pixel based on the confidence weighted metric of each of the neighboring pixels and based on the category of one of the neighboring pixels.

In some embodiments, the confidence weighted metric is further based on a spatial filter function.

In some embodiments, the spatial filter function has a greater value for a first neighboring pixel than for a second neighboring pixel, the first pixel being closer to the first neighboring pixel than to the second neighboring pixel.

In some embodiments: the spatial filter function is within 30% of $(x2-x)(y2-y)/((x2-x1)(y2-y1))$, x1 and y1 are the coordinates of the first neighboring pixel, x2 and y2 are the coordinates of the second neighboring pixel, and x and y are the coordinates of the first pixel.

In some embodiments, the spatial filter function is, for each of the neighboring pixels, within 30% of a Gaussian function of coordinate differences between the first pixel and the neighboring pixel.

In some embodiments, the confidence weighted metric is further based on a range filter function.

In some embodiments, the range filter function has a greater value for a first neighboring pixel than for a second neighboring pixel, the first pixel being closer, in intensity, to the first neighboring pixel than to the second neighboring pixel.

In some embodiments, the confidence weighted metric is further based on a spatial filter function.

In some embodiments, the determining of the category of the first pixel includes determining the category of the first pixel to be the category of the pixel, of the neighboring pixels, having the greatest confidence weighted metric.

In some embodiments, the determining of the category of the first pixel includes determining the category of the first pixel to be the category for which the sum of the confidence weighted metrics, over all of the neighboring pixels in the category, is greatest.

According to an embodiment of the present disclosure, there is provided a system including a processing circuit, the processing circuit being configured to: determine a category of a first pixel of an image, the first pixel having a plurality of neighboring pixels, each of the neighboring pixels having a category; and process the image based on the determined category, the determining including: calculating a confidence weighted metric for each of the neighboring pixels, the confidence weighted metric being based on a maximum confidence value for each of the neighboring pixels; and determining the category of the first pixel based on the confidence weighted metric of each of the neighboring pixels and based on the category of one of the neighboring pixels.

In some embodiments, the confidence weighted metric is further based on a spatial filter function.

In some embodiments, the spatial filter function has a greater value for a first neighboring pixel than for a second neighboring pixel, the first pixel being closer to the first neighboring pixel than to the second neighboring pixel.

In some embodiments: the spatial filter function is within 30% of $(x2-x)(y2-y)/((x2-x1)(y2-y1))$, x1 and y1 are the coordinates of the first neighboring pixel, x2 and y2 are the coordinates of the second neighboring pixel, and x and y are the coordinates of the first pixel.

In some embodiments, the spatial filter function is, for each of the neighboring pixels, within 30% of a Gaussian function of coordinate differences between the first pixel and the neighboring pixel.

In some embodiments, the confidence weighted metric is further based on a range filter function.

In some embodiments, the range filter function has a greater value for a first neighboring pixel than for a second neighboring pixel, the first pixel being closer, in intensity, to the first neighboring pixel than to the second neighboring pixel.

In some embodiments, the confidence weighted metric is further based on a spatial filter function.

In some embodiments, the determining of the category of the first pixel includes determining the category of the first pixel to be the category of the pixel, of the neighboring pixels, having the greatest confidence weighted metric.

According to an embodiment of the present disclosure, there is provided a system including means for processing, the means for processing being configured to: determine a category of a first pixel of an image, the first pixel having a plurality of neighboring pixels, each of the neighboring pixels having a category; and process the image based on the determined category, the determining including: calculating a confidence weighted metric for each of the neighboring pixels, the confidence weighted metric being based on a maximum confidence value for each of the neighboring pixels; and determining the category of the first pixel based on the confidence weighted metric of each of the neighboring pixels and based on the category of one of the neighboring pixels.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for upsampling of categorical maps provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In the fields of computer vision and image processing, 2-D interpolation from a low-resolution image or map to high resolution, i.e., upsampling, is a common operation. With the advent of deep learning applications in computer vision, neural networks that predict pixel-level categorical data have become important. Such a neural network may receive an image and produce a categorical map. For example, for an image of a plant in front of a background (as, e.g., in FIGS. 6 and 7A-7C discussed below), the categorical map may be a map in which each pixel is assigned a category, e.g., a zero if the pixel is classified as being part of the background, and a one if the pixel is part of the plant. In an image with a cat, a dog, and a plant in front of a background, each pixel of the categorical map may be classified into one of the four corresponding categories. In a neural network producing such a categorical map, an intermediate feature map of the neural network may include a confidence volume including four channels, including a first channel of the confidence volume specifying, for each pixel, the probability that the pixel is part of the cat, a second channel of the confidence volume specifying, for each pixel, the probability that the pixel is part of the dog, a third channel of the confidence volume specifying, for each pixel, the probability that the pixel is part of the plant, and a fourth channel of the confidence volume specifying, for each pixel, the probability that the pixel is part of the background.

Figure 1A:
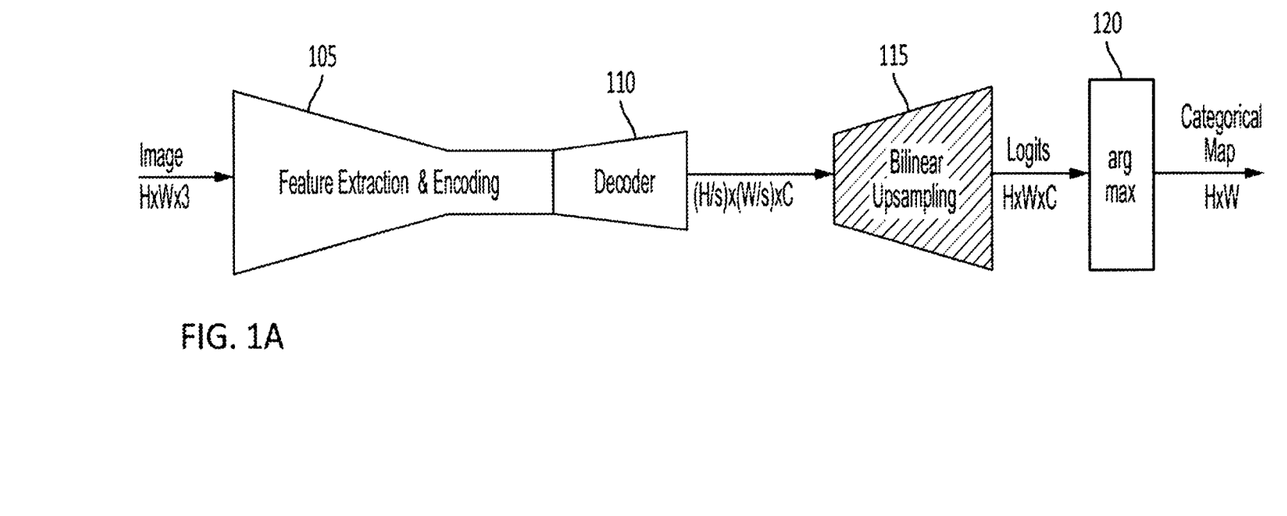
FIG. 1A is a block diagram of a system for analyzing images.

In a related art neural network, the neural networks may operate, for the majority of the layers of the neural network, at lower resolution than the input resolution. To obtain, at the output of the neural network, a categorical map at the input resolution (i.e., an output map having the same resolution as the input image), bilinear upsampling may be used in the final layer. Such a neural network is illustrated in FIG. 1A. It includes a feature extraction and encoding circuit 105 (within which the feature map size is reduced significantly, as illustrated by the taper of this circuit), a decoder 110 (within which the feature map size is increased somewhat), a bilinear upsampling circuit 115 (within which the feature map size is increased further) and an argmax circuit 120 which produces the categorical map. The output of the bilinear upsampling circuit 115 may be a confidence volume consisting of C channels, where C is the number of categories, each channel of the confidence volume including a map at the same resolution (H×W) as the input image. The argmax circuit may then assign, to each pixel of the output feature map, the category for which the confidence (i.e., the confidence for the pixel, in the channel corresponding to the category) is greatest.

In the embodiment of FIG. 1A, upsampling the volume of logits requires substantial computations with a time complexity of O(N*C), where N is the number of pixels and C is the cardinality of the categorical data (i.e., the number of categories or channels). This computational burden may make this approach unsuitable for some real-time applications.

Figure 1B:
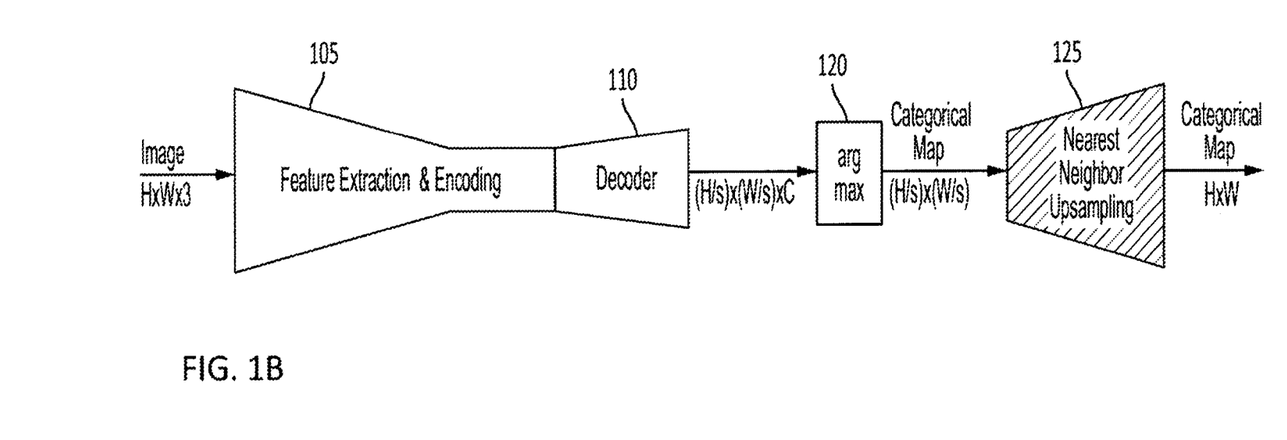
FIG. 1B is a block diagram of a system for analyzing images.

In contrast, deducing the 2-D categorical map at the lower resolution first and then upsampling only the categorical map may have a complexity of only O(N). However, a lack of effective and fast upsampling methods for categorical data may be an obstacle to such optimization. Categorical values may not follow any sort of ordering or relationship between one another. Therefore, interpolation methods such as bilinear interpolation or polynomial interpolation may not be directly applicable. Nearest neighbor interpolation may be used instead, for upsampling of categorical data, as illustrated in FIG. 1B. In the embodiment of FIG. 1B, the output of the decoder 110 is the input to an argmax circuit 120, which receives C low-resolution (H/s×W/s) channels of the confidence volume and generates from them a single low-resolution (H/s×W/s) categorical map. This low-resolution categorical map may then be upsampled, using e.g., a nearest-neighbor upsampling circuit 125, to a full-resolution (H×W) category map.

Nearest neighbor upsampling may introduce aliasing, however, due to a lack of pixel support at edges corresponding to the boundaries of regions corresponding to different categories. This aliasing may manifest itself in the form of undesirable staircase shapes and jagging artifacts at the edges (as discussed below, in the context of FIG. 7B).

In some embodiments, these issues are mitigated with the use of an upsampling function that is not unduly burdensome from a computational perspective. The upsampling function determines the high-resolution categorical map (which may be referred to as the target categorical map T) using a method based on a confidence weighted metric. For each target pixel, a corresponding pixel neighborhood is defined in the low-resolution categorical map (which may be referred to as the source categorical map S). The confidence weighted metric may be computed for each neighboring source pixel. The target pixel value may then be set equal to (i) the categorical value of the neighboring source pixel that has the highest confidence weighted metric, or (ii) the category for which the sum of the confidence weighted metric, over all of the neighboring pixels in that category, is greatest.

Figure 2:
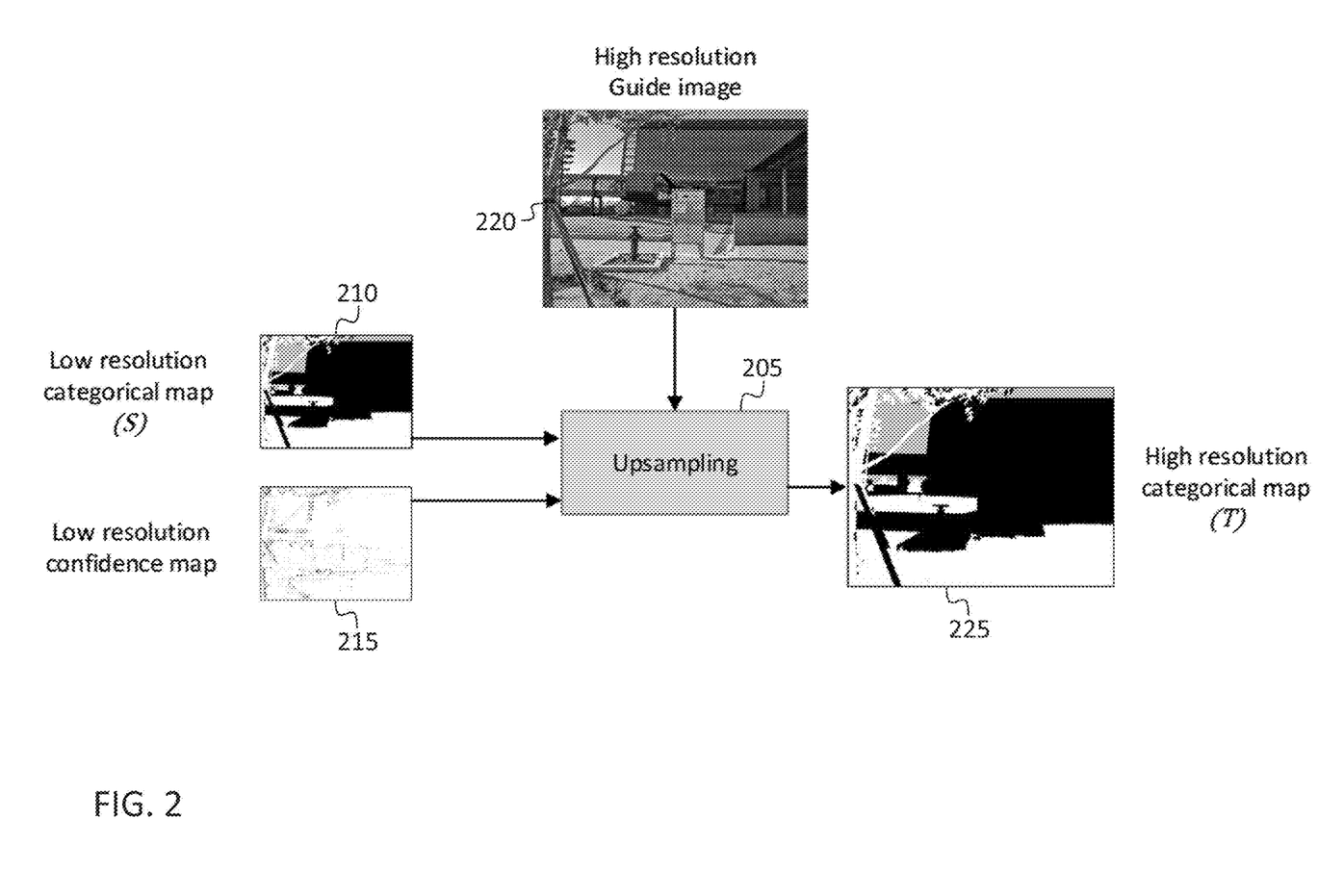
FIG. 2 is a block diagram showing inputs and the output of an upsampling circuit, according to an embodiment of the present disclosure.

The process is shown pictorially in FIG. 2. The inputs to the categorical upsampling circuit 205 (which may be, or include, a processing circuit (discussed in further detail below)) may include a low-resolution categorical map 210, a low-resolution confidence map 215, and a high-resolution guide image 220 (which is shown as a grayscale image but which may be a color image); the output of the categorical upsampling circuit 205 may be a high-resolution categorical map 225. As discussed in further detail below, the neural network may generate one low-resolution channel of the confidence volume per channel; the confidence map 215 may contain, in each pixel, the maximum, over the channels, of the corresponding pixels of the channels of the confidence volume.

Figure 3:
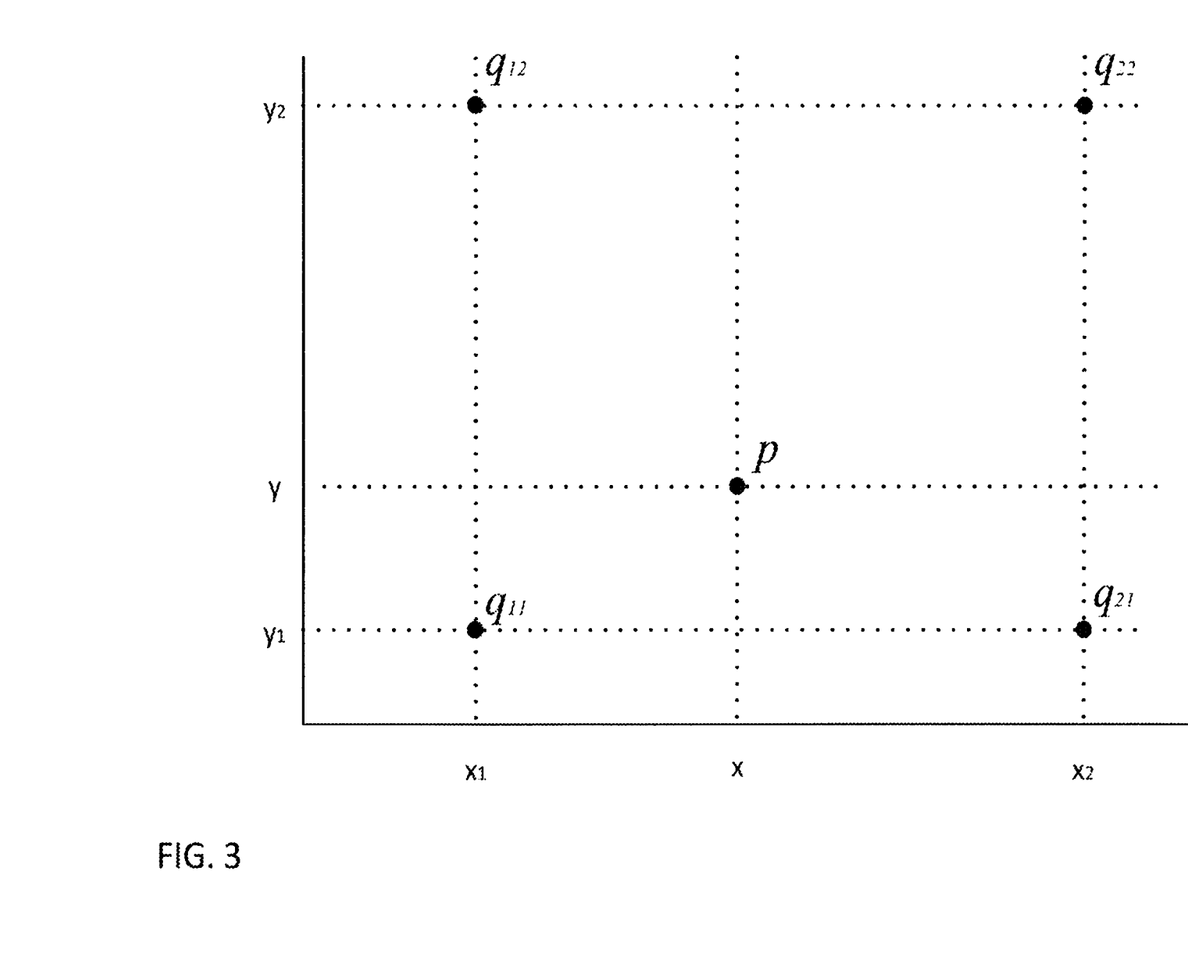
FIG. 3 is a diagram of an upsampled pixel and four neighboring pixels, according to an embodiment of the present disclosure.

FIG. 3 shows the locations of a pixel p of the target high-resolution categorical map and four of its neighboring pixels $q_{11}$, $q_{12}$, $q_{21}$, and $q_{22}$, in the low-resolution categorical map 210, and in the low-resolution confidence map 215. Only one of the target pixels is shown; if all of the target pixels were shown, then, in some embodiments, a large number of target pixels would be present between the four neighboring pixels $q_{11}$, $q_{12}$, $q_{21}$, and $q_{22}$. In some embodiments, more than four neighboring pixels (e.g., 9 or more pixels, which may be arranged in a square or in quasi-circular neighborhood, which may omit some pixels from near the corners of a square) may be used.

Figure 4:
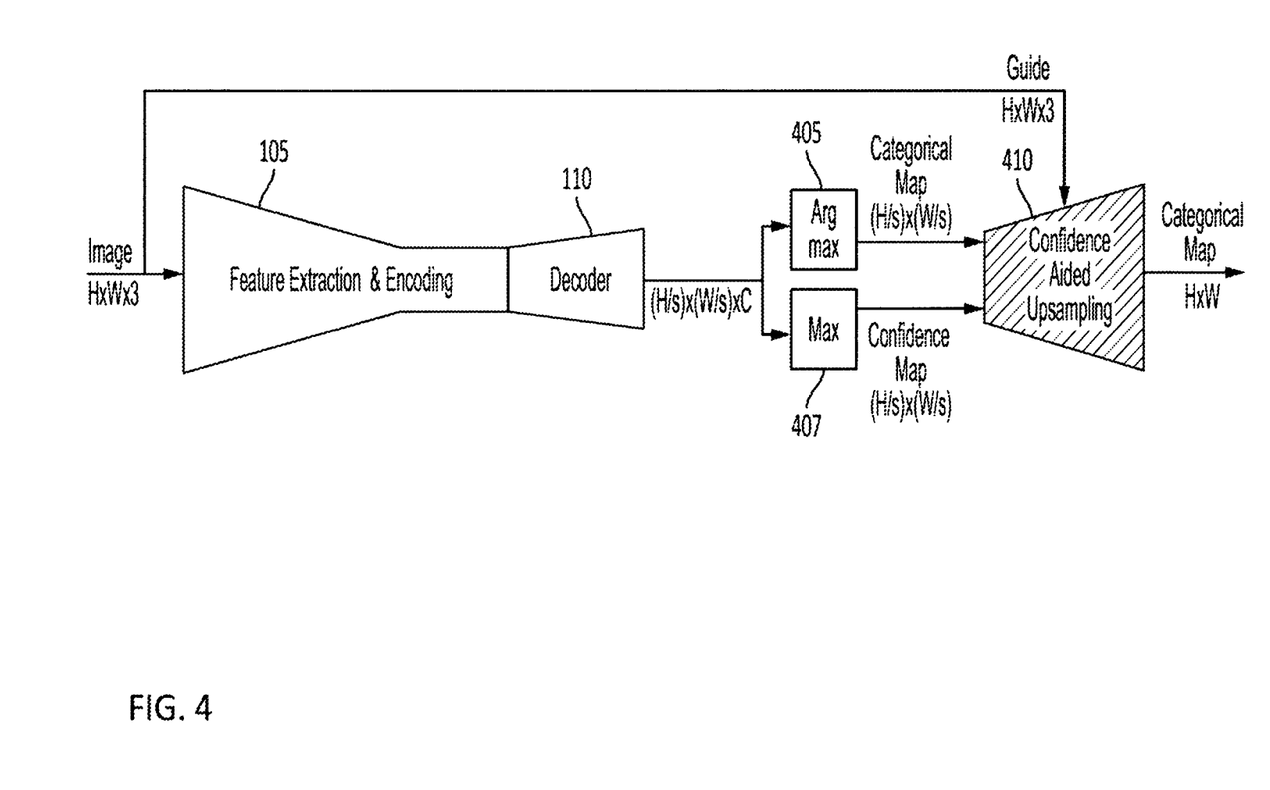
FIG. 4 is a block diagram of a system for analyzing images, according to an embodiment of the present disclosure.

In some embodiments, the confidence weighted metric is computed as a function of (i) a confidence map (ii) a measure of geometric proximity to nearest neighbors, and (iii) photometry (i.e., intensity or color) of a high-resolution guide image. The category of each pixel of the target high-resolution categorical map may then be determined based on the confidence weighted metrics of the pixel's neighboring pixels (as discussed in further detail below). FIG. 4 is a block diagram of such an embodiment. In the embodiment of FIG. 4, the output of the decoder 110 is fed into an argmax circuit 405, which generates a category map (each element of the category map being the argmax, over the channels, of the channels of the confidence volume at the input of the argmax circuit 405) and into a max circuit 407, which generates the confidence map (each element of the confidence map being the maximum, over the channels, of the channels of the confidence volume at the input of the max circuit 407), each at low resolution. A confidence aided upsampling circuit then generates the target high-resolution categorical map, using (as illustrated in FIG. 2) the low-resolution categorical map 210, the low-resolution confidence map 215, and the high-resolution guide image 220. The use of the confidence weighted metric may involve little complexity and therefore be generally well suited to real-time analyses, and it may mitigate the staircase or jagging artifacts that may be exhibited by nearest neighbor upsampling.

In some embodiments, the confidence weighted metric is defined as $$w_p(q) = C_q f(q,p) g(I_{q\uparrow}, I_{p\uparrow}), \forall q \in \Omega_p,$$

where:
$\Omega_p$ denotes the neighborhood of the target pixel($p_\uparrow$) in S,
$\Omega_q$ is the confidence value (from the confidence map 215) at q,
I is the high resolution guide image,
$f(.)$ is the spatial filter function, and
$g(.)$ is the range filter function centered at the image value at $p_\uparrow$.

For $q \in \Omega_p$, $q_\uparrow$ denotes the corresponding high-resolution coordinate in T.

The spatial filter $f(.)$ may be any suitable function that takes the proximity of q to p into account, e.g., any function that generally weights neighboring pixels that are near the target pixel more heavily than neighboring pixels that are more distant from the target pixel. For example, the spatial filter may be a function that increases monotonically with decreasing distance. In some embodiments, the spatial filter uses bilinear weights, with the weight of pixel $q_{11}$ calculated as follows:

$$f = (x2-x)(y2-y)/((x2-x1)(y2-y1)),$$

where x1 and y1 are the coordinates of pixel $q_{11}$, x2 and y2 are the coordinates of pixel $q_{22}$, and x and y are the coordinates of pixel p. In other embodiments, the spatial filter is a Gaussian function centered at p; for example, the weight of pixel $q_{11}$ may be equal to or proportional to $\exp(-((x-x1)^2+(y-y1)^2)/w^2)$, where w is the width of the Gaussian function. In some embodiments the spatial filter is approximately equal to such a function, e.g., it is within 30% of such a function.

The range filter $g(.)$ may measure the proximity in photometry (intensity or color) between the pixels $q_\uparrow$ and the pixel $p_\uparrow$ in the high-resolution guide image. The selection of a range filter may be application dependent. The range filter may be any suitable function that takes the similarity of the pixel values at q and p in the guide image into account, e.g., any function that generally weights neighboring pixels that have values (e.g., intensities or colors) similar to those of the target pixel more heavily than neighboring pixels that have values that are more different from those of the target pixel. For example, the range filter function may have a greater value for a first neighboring pixel than for a second neighboring pixel, when the target pixel is closer, in intensity, to the first neighboring pixel than to the second neighboring pixel. As used herein, when a first pixel is "closer in intensity", to a target pixel, than a second pixel, it means that the difference between the intensity of the first pixel and the intensity of the target pixel is less than the difference between the intensity of the second pixel and the intensity of the target pixel. In some embodiments, the range filter is a Gaussian centered over $I_{p\uparrow}$, e.g., for the pixel $q_{11}$ it may be equal to or proportional to $\exp(-((I_{p\uparrow}-I_{q1})^2/w^2)$, where $I_{p\uparrow}$ is the intensity of the pixel, in the guide image, at the same coordinates as the target pixel $p_\uparrow$, $I_{q\uparrow}$ is the intensity of the pixel, in the guide image, at the same location as the neighboring pixel $q_{11}$, and w is the width of the Gaussian function. In other embodiments the range filter may be a function (e.g., a Gaussian function) of the vector difference between the color components of the corresponding pixels of the guide image (e.g., of the difference between the red green blue (RGB) vectors) or of the difference between the luminance and chrominance (YUV) components). In some embodiments the range filter is approximately equal to such a function, e.g., it is within 30% of such a function. As used herein, a "range filter function" is a function that calculates a measure of the extent to which the display values (e.g., the intensity, or aspects of the color displayed) are the same for two pixels.

In some embodiments not all of the three factors $C_q$, $f(q, p)$, and $g(I_{q\uparrow}, I_{p\uparrow})$ are present in the expression used to calculate the confidence weighted metric. For example, the spatial filter function $f(.)$ may be set to 1 to ignore the spatial component, or the range filter function $g(.)$ may be set to 1 to ignore the photometry component (or both may be set to 1).

Once the confidence weighted metric has been calculated for each of the neighboring pixels, the category of the target pixel may be determined based on the confidence weighted metric of each of the neighboring pixels and based on the category of one (or more) of the neighboring pixels. For example, the interpolated value at $p_\uparrow$ may be (i) set equal to the categorical value of the neighboring pixel in $\Omega_p$ that has the highest confidence weighted metric $w_p$ when using an argmax operation, or (ii) set based on a method that may be referred to as a weighted histogram over the categorical values, or as a "mode filter".

If an argmax operation is used, then the categorical value at $p_\uparrow$, i.e. $T_{p\uparrow}$ may be assigned as follows:

$$T_{p\uparrow} = S_{q_{opt}},$$

where $q_{opt} = \mathrm{argmax}_{q \in \Omega_p}(w_p(q))$.

This operation sets the category of the target pixel equal to the category of the neighboring pixel having the highest confidence weighted metric.

If a mode filter is used, then a mode may be computed over a weighted histogram:

$$T_{p\uparrow} = \mathrm{argmax}_{l \in L} h(l),$$

where $$h(l) = \Sigma_{q \in \Omega_p} \delta(S_q = l) * w_p(q),$$

$$\delta(S_q = l) = \{_{0, otherwise}^{1 \; if \; S_q = l},$$

L denotes the set of possible categorical values, and $h(l)$ is the weighted histogram computed for $l \in L$ in the neighborhood $\Omega_p$.

This operation sets the category of the target pixel equal to the category for which the sum of the confidence weighted metrics, over all of the neighboring pixels in the category, is greatest. The mode filter is a variant of the statistical mode; if the confidence weighted metric is the same for all of the neighboring pixels, then the category returned by the mode filter is the statistical mode of the set of categories of the neighboring pixels.

Figure 5A:
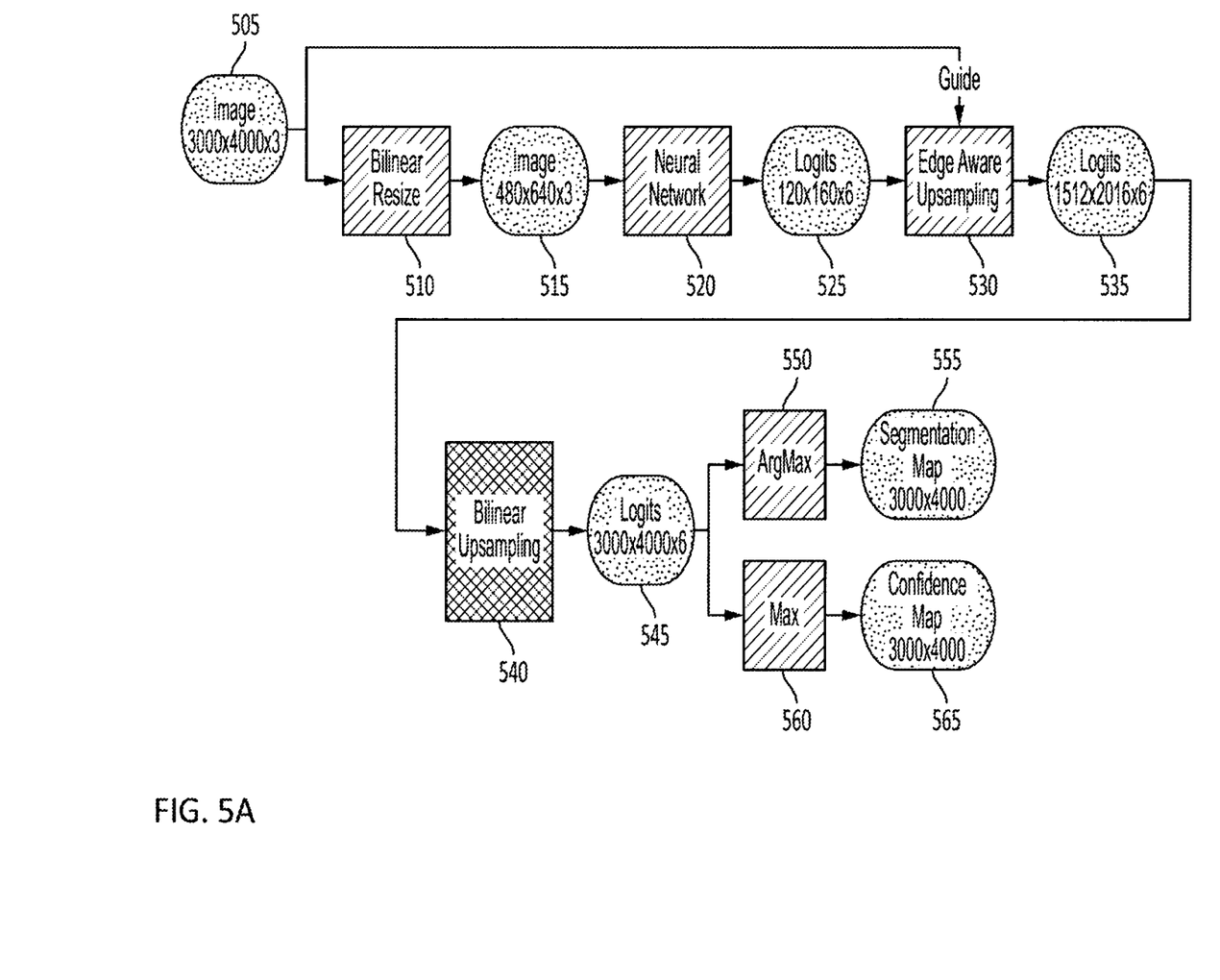
FIG. 5A is a block diagram of a pipeline for analyzing images.
Figure 5B:
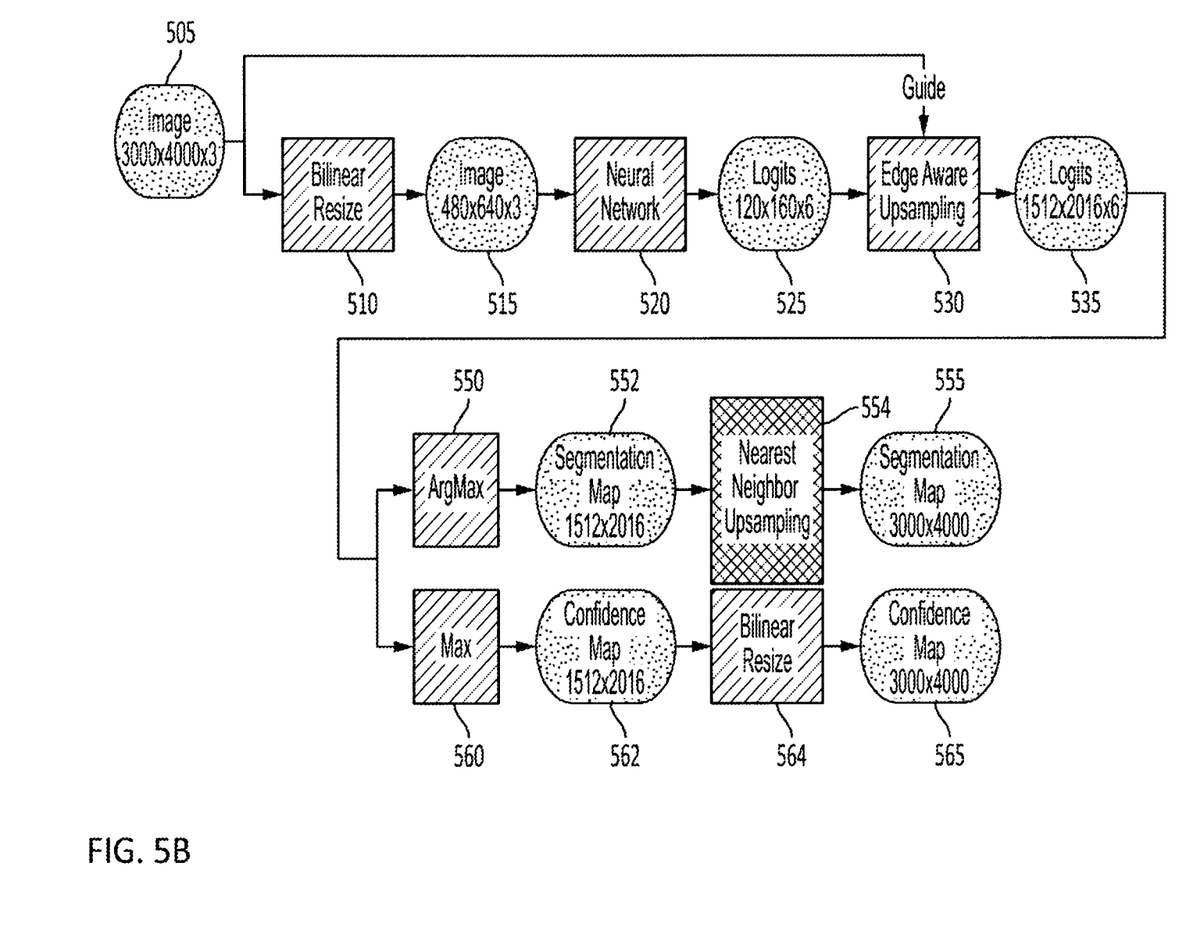
FIG. 5B is a block diagram of a pipeline for analyzing images.
Figure 5C:
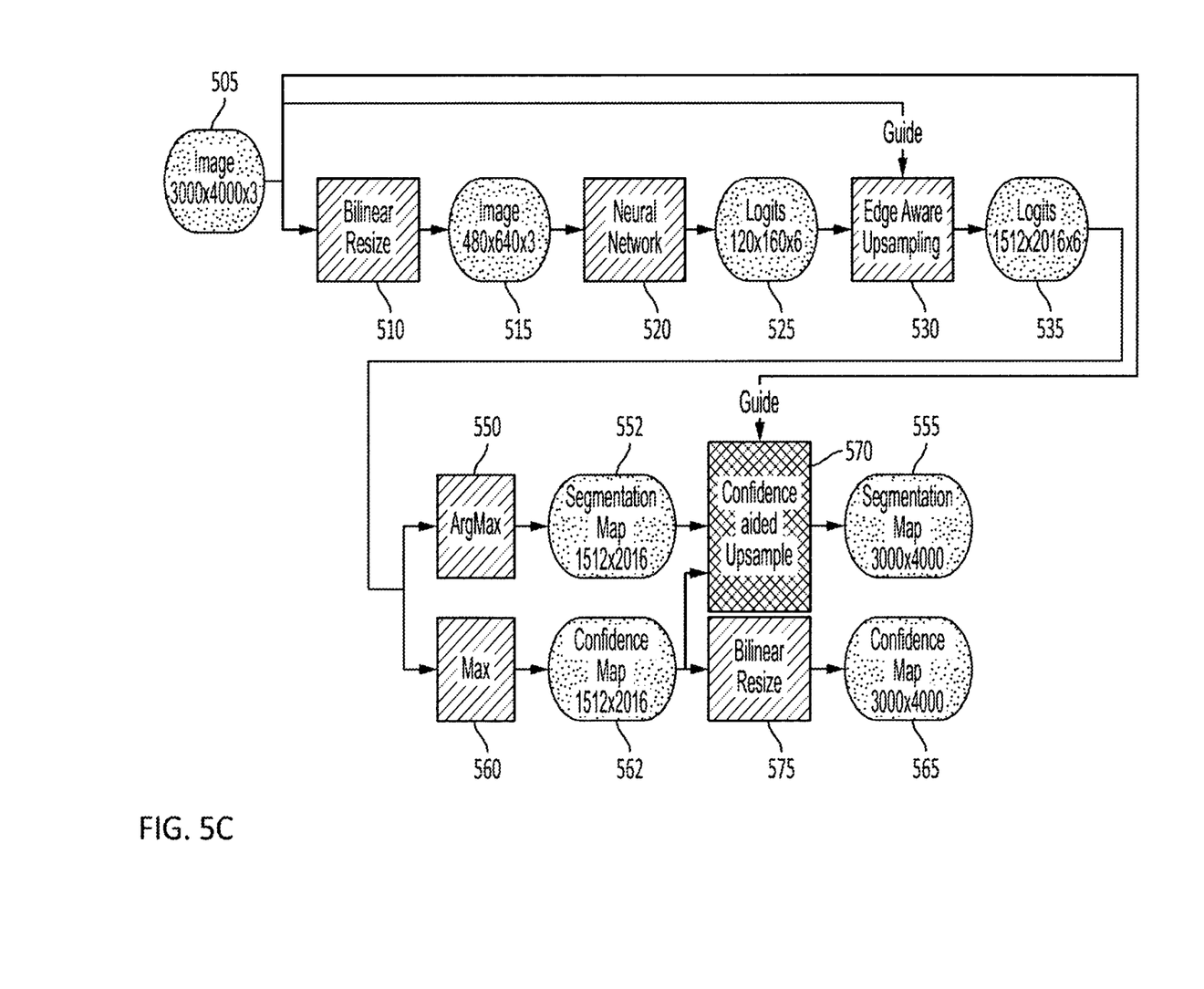
FIG. 5C is a block diagram of a pipeline for analyzing images, according to an embodiment of the present disclosure.

FIGS. 5A-5C show related art pipelines for three processing methods. The image dimensions specified in these figures are only examples, and may be different based on the application requirements. In the embodiment of FIG. 5A, which shows a pipeline for bilinear upsampling of logits (corresponding to FIG. 1A), the input image 505 is processed by a bilinear resizing circuit 510 to produce a resized image 515, which is processed by a neural network 520, which produces a first array of logits 525. An edge aware upsampling circuit 530 then upsamples the first array of logits 525, using the input image 505 as a guide image, to form a second array of logits 535. A bilinear upsampling circuit 540 then produces, from the second array of logits 535, a third array of logits 545, and, from this third array of logits 545, an argmax circuit 550 generates a high-resolution categorical map 555 (or, in the case of segmentation, a segmentation map), and a max circuit 560 generates a high-resolution confidence map 565.

In the embodiment of FIG. 5B, which shows a pipeline for nearest neighbor upsampling of a segmentation map (corresponding to FIG. 1B), the second array of logits 535 is produced in the same manner as in FIG. 5A. An argmax circuit 550 then generates, from the second array of logits 535, a low-resolution segmentation map 552, which is converted by a nearest neighbor upsampling circuit 554 to a high-resolution categorical map 555, and a max circuit 560 generates, from the second array of logits 535, a low-resolution confidence map 562 (which may be the same as the confidence map 215 of FIG. 2), which is resized, by a bilinear resizing circuit 564, to form a high-resolution confidence map 565.

In the embodiment of FIG. 5C, which shows a pipeline for nearest neighbor upsampling of categorical maps aided by confidence weighting (corresponding to FIG. 4) the low-resolution segmentation map 552 and the low-resolution confidence map 562 are produced in the same manner as in FIG. 5B. A confidence aided upsampling circuit 570 then performs upsampling of the low-resolution segmentation map 552 based on the low-resolution confidence map 562, using the input image 505 as a guide image, to form the high-resolution categorical map 555. The confidence aided upsampling circuit 570 may perform one or more of the methods described herein, including calculating a confidence weighted metric for each of a plurality of neighboring pixels of a target pixel, and assigning a category to the target pixel, e.g., using an argmax method or a mode filter method.

Figure 6:
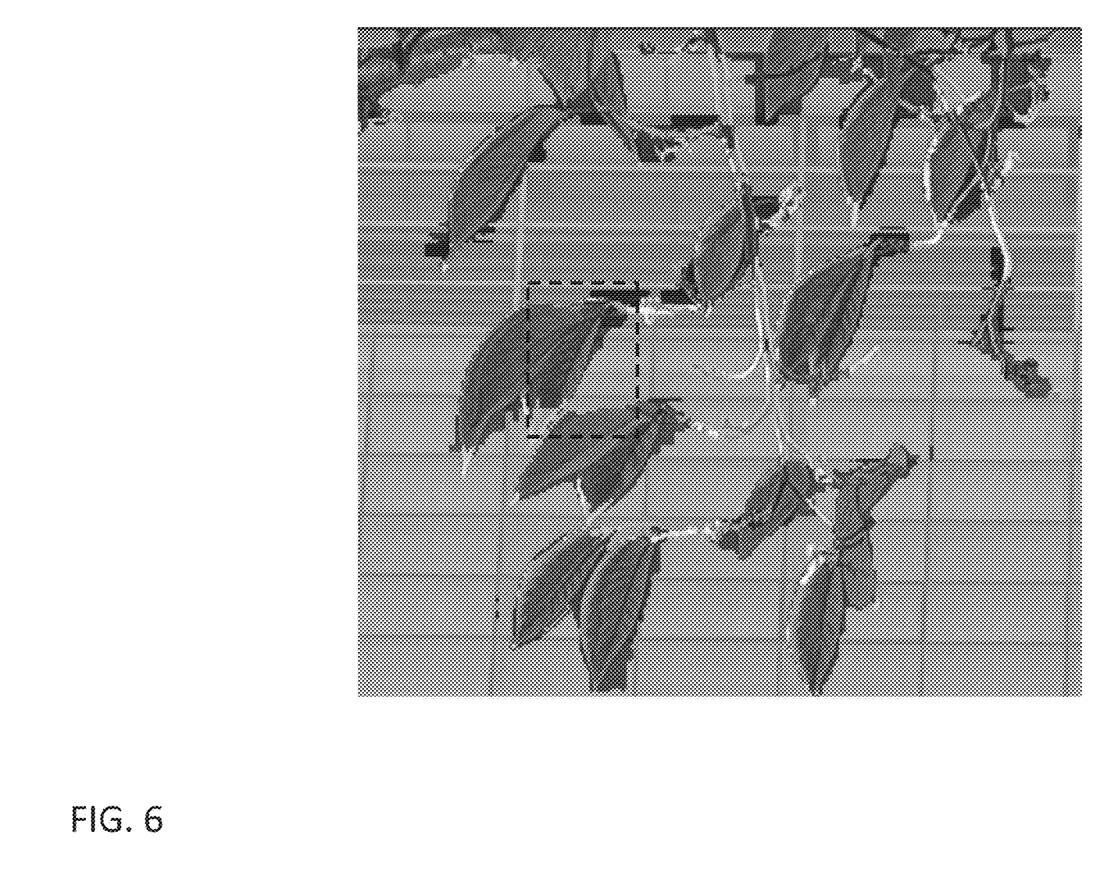
FIG. 6 is a processed image, according to an embodiment of the present disclosure.
Figure 7A:
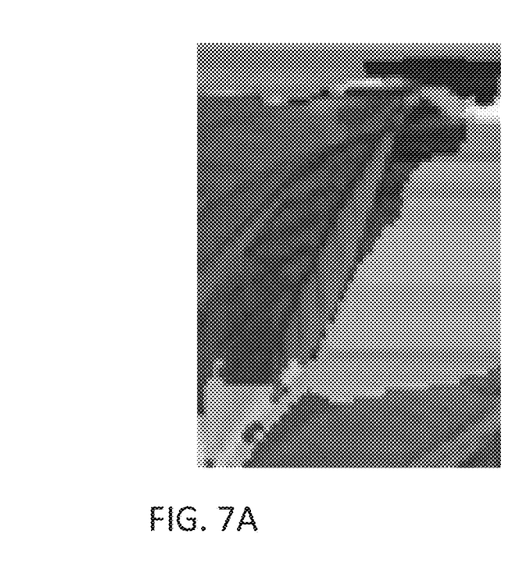
FIG. 7A is an enlarged portion of a processed image, according to an embodiment of the present disclosure.
Figure 7B:
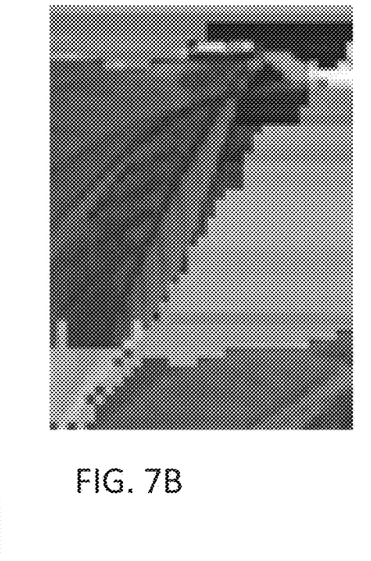
FIG. 7B is an enlarged portion of a processed image, according to an embodiment of the present disclosure.
Figure 7C:
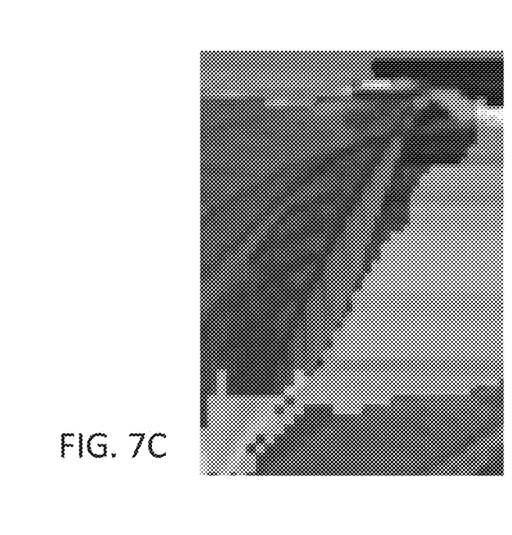
FIG. 7C is an enlarged portion of a processed image, according to an embodiment of the present disclosure.

FIG. 6 is a grayscale version of a color image processed by the embodiment of FIGS. 4 and 5C, with gray overlaid shapes showing regions that the segmentation algorithm identified as corresponding to the plant shown in the image. FIGS. 7A-7C are enlarged views of a portion of the image (the portion in the dashed rectangle in FIG. 6), showing the results of processing the image with the three respective segmentation algorithms of (i) FIGS. 1A and 5A, (ii) FIGS. 1B and 5B, (iii) FIGS. 4 and 5C. Staircase and jagging artifacts are particularly apparent in FIG. 7B.

Figure 8:
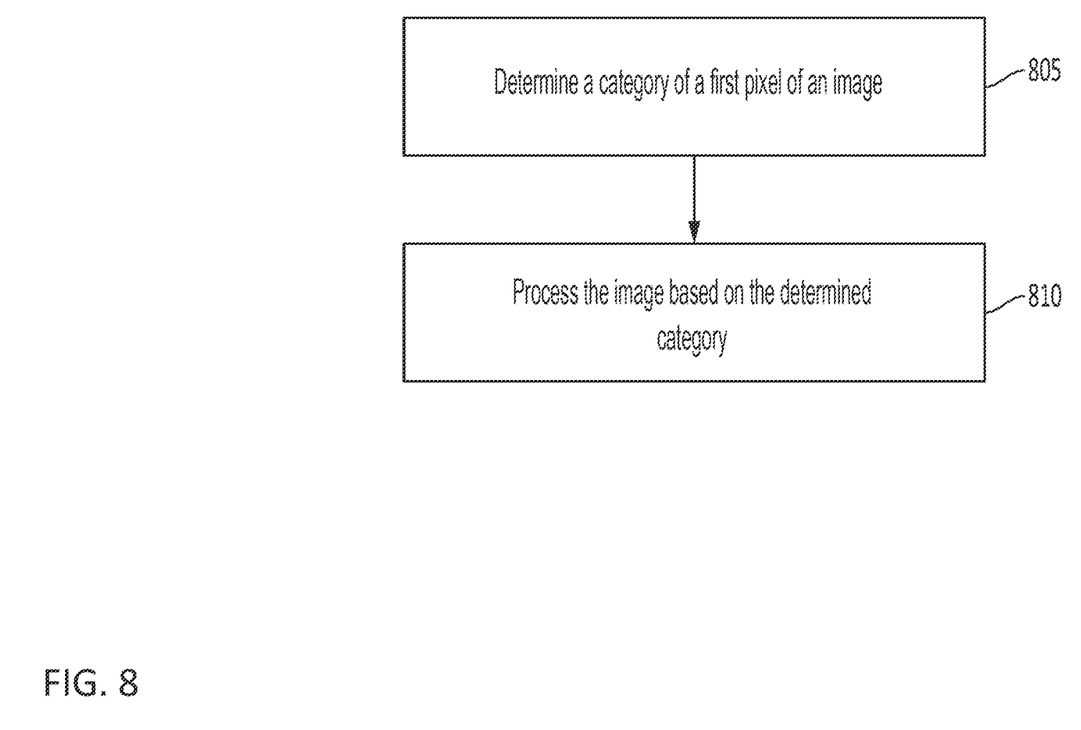
FIG. 8 is a flowchart of a method, according to an embodiment of the present disclosure.

FIG. 8 is a flowchart of a method, in some embodiments. The method includes determining, at 805, a category of a first pixel of an image, the first pixel having a plurality of neighboring pixels, each of the neighboring pixels having a category; and, at 810, processing the image based on the determined category. The image may be the high-resolution input image 505 (which may also be used as a guide image), and the generating of the high-resolution segmentation map 555 may correspond to determining a category for each pixel of the high-resolution input image 505. The processing, at 810, of the image 505 may include, e.g., processing different portions of the image (corresponding to different categories) differently, e.g., blurring a region of pixels categorized as background, or brightening a region corresponding to one category and darkening a region corresponding to another category. As used herein, "processing the image" means processing the image directly, or processing any product of other processing steps performed based on the image. As such, processing the image may include (or consist of) using the high-resolution segmentation map 555 in other processing steps (e.g., in an algorithm for machine-vision based navigation of a vehicle, classifying objects in the field of view of a camera into different categories (e.g., other vehicles, buildings, street signs, or pedestrians)).

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X-Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, the term "array" refers to an ordered set of numbers regardless of how stored (e.g., whether stored in consecutive memory locations, or in a linked list). As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity. As used herein, "based on" means "based at least in part on", i.e., a first quantity that is described as being based on a second quantity may also be based on a third quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for upsampling of categorical maps have been specifically described and illustrated herein, many modifications and variations will be apparent to those skilled in the art. Accordingly, it is to be understood that a system and method for upsampling of categorical maps constructed according to principles of this disclosure may be embodied other than as specifically described herein. The invention is also defined in the following claims, and equivalents thereof.

What is claimed is:

1. A method, comprising:
   determining a category of a first pixel of an image, the first pixel having a plurality of neighboring pixels, each of the neighboring pixels having a category; and
   processing the image based on the determined category, the determining comprising:
   calculating a confidence weighted metric for each of the neighboring pixels, the confidence weighted metric being based on a maximum confidence value among each of the neighboring pixels and a range filter function; and determining the category of the first pixel based on the confidence weighted metric of each of the neighboring pixels and based on the category of one of the neighboring pixels.

2. The method of claim 1, wherein the confidence weighted metric is further based on a spatial filter function.

3. The method of claim 2, wherein the spatial filter function has a greater value for a first neighboring pixel than for a second neighboring pixel, the first pixel being closer to the first neighboring pixel than to the second neighboring pixel.

4. The method of claim 3, wherein:
the spatial filter function is within 30% of $(x2-x)(y2-y)/((x2-x1)(y2-y1))$,
x1 and y1 are the coordinates of the first neighboring pixel,
x2 and y2 are the coordinates of the second neighboring pixel, and
x and y are the coordinates of the first pixel.

5. The method of claim 4, wherein the spatial filter function is, for each of the neighboring pixels, within 30% of a Gaussian function of coordinate differences between the first pixel and the neighboring pixel.

6. The method of claim 1, wherein the range filter function has a greater value for a first neighboring pixel than for a second neighboring pixel, the first pixel being closer, in intensity, to the first neighboring pixel than to the second neighboring pixel.

7. The method of claim 1, wherein the confidence weighted metric is further based on a spatial filter function.

8. The method of claim 1, wherein the determining of the category of the first pixel comprises determining the category of the first pixel to be the category of the pixel, of the neighboring pixels, having the greatest confidence weighted metric.

9. The method of claim 1, wherein the determining of the category of the first pixel comprises determining the category of the first pixel to be the category for which the sum of the confidence weighted metrics, over all of the neighboring pixels in the category, is greatest.

10. A system comprising a processing circuit, the processing circuit being configured to:
determine a category of a first pixel of an image, the first pixel having a plurality of neighboring pixels, each of the neighboring pixels having a category; and
process the image based on the determined category,
the determining comprising:
calculating a confidence weighted metric for each of the neighboring pixels, the confidence weighted metric being based on a maximum confidence value for each of the neighboring pixels and a range filter function; and
determining the category of the first pixel based on the confidence weighted metric of each of the neighboring pixels and based on the category of one of the neighboring pixels.

11. The system of claim 10, wherein the confidence weighted metric is further based on a spatial filter function.

12. The system of claim 11, wherein the spatial filter function has a greater value for a first neighboring pixel than for a second neighboring pixel, the first pixel being closer to the first neighboring pixel than to the second neighboring pixel.

13. The system of claim 12, wherein:
the spatial filter function is within 30% of $(x2-x)(y2-y)/((x2-x1)(y2-y1))$,
x1 and y1 are the coordinates of the first neighboring pixel,
x2 and y2 are the coordinates of the second neighboring pixel, and
x and y are the coordinates of the first pixel.

14. The system of claim 13, wherein the spatial filter function is, for each of the neighboring pixels, within 30% of a Gaussian function of coordinate differences between the first pixel and the neighboring pixel.

15. The system of claim 10, wherein the range filter function has a greater value for a first neighboring pixel than for a second neighboring pixel, the first pixel being closer, in intensity, to the first neighboring pixel than to the second neighboring pixel.

16. The system of claim 10, wherein the confidence weighted metric is further based on a spatial filter function.

17. The system of claim 10, wherein the determining of the category of the first pixel comprises determining the category of the first pixel to be the category of the pixel, of the neighboring pixels, having the greatest confidence weighted metric.

18. A system comprising means for processing, the means for processing being configured to:
determine a category of a first pixel of an image, the first pixel having a plurality of neighboring pixels, each of the neighboring pixels having a category; and
process the image based on the determined category,
the determining comprising:
calculating a confidence weighted metric for each of the neighboring pixels, the confidence weighted metric being based on a maximum confidence value for each of the neighboring pixels and a range filter function; and
determining the category of the first pixel based on the confidence weighted metric of each of the neighboring pixels and based on the category of one of the neighboring pixels.

* * * * *